United States Patent
Verma

(10) Patent No.: US 11,076,540 B2
(45) Date of Patent: Aug. 3, 2021

(54) COGNITIVE SYSTEM USING PLANT-BASED DATA TO TRIGGER WATERING

(71) Applicant: INTERNATIONAL BUSINESS MACHINES CORPORATION, Armonk, NY (US)

(72) Inventor: Pramod Verma, Fairfax, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/695,706

(22) Filed: Nov. 26, 2019

(65) Prior Publication Data

US 2020/0093078 A1  Mar. 26, 2020

Related U.S. Application Data

(62) Division of application No. 15/437,619, filed on Feb. 21, 2017, now Pat. No. 10,531,617.

(51) Int. Cl.
  *A01G 25/16* (2006.01)
  *A01G 7/06* (2006.01)
  *A01G 27/00* (2006.01)

(52) U.S. Cl.
  CPC .......... *A01G 25/167* (2013.01); *A01G 7/06* (2013.01); *A01G 27/003* (2013.01)

(58) Field of Classification Search
  CPC ....... A01G 25/16; A01G 25/167; A01G 27/03
  See application file for complete search history.

(56) References Cited

U.S. PATENT DOCUMENTS 3,653,595 A  4/1972  Greengard, Jr. et al.
4,838,310 A  6/1989  Scott et al.
(Continued)

FOREIGN PATENT DOCUMENTS

CN      202697423 A1   1/2013
WO   WO2011141901 A1  11/2011
(Continued)

OTHER PUBLICATIONS

Agriculture Victoria, How to use tensiometers, Sep. 2000, Department of Environment and Primary Industries (Year: 2000).*
(Continued)

*Primary Examiner* — Kristen C Hayes
(74) *Attorney, Agent, or Firm* — Brian Restauro, Esq.; Kevin P. Radigan, Esq.; Heslin Rothenberg Farley & Mesiti P.C.

(57) ABSTRACT

A method of plant-initiated, cognitive watering is provided, which includes providing first a sensor(s) to ascertain water content within a xylem of a root of a first plant to determine tensile stress on a first root wall of the first plant, and a second sensor(s) to determine water content within a xylem of a root of a second plant to determine tensile stress on a second root wall of the second plant. Further, the method includes operatively coupling the first and second sensors to a control to determine whether the tensile stress on the first root wall reaches a specified threshold, and to determine whether tensile stress on the second root wall correlates to there being excess water content in soil in a region of the second plant, and if so, initiating, via the control, moving water from the region of the second plant to soil around the first plant.

14 Claims, 9 Drawing Sheets

(56) References Cited

U.S. PATENT DOCUMENTS

| | | | |
|---|---|---|---|
| 5,464,456 | A | 11/1995 | Kertz |
| 6,766,817 | B2 | 7/2004 | da Silva |
| 6,918,404 | B2 | 7/2005 | Dias Da Silva |
| 6,928,339 | B2 | 8/2005 | Barker |
| 6,978,794 | B2 | 12/2005 | Dukes et al. |
| 7,198,431 | B2 | 4/2007 | Gesser |
| 7,962,245 | B2 | 6/2011 | Runge et al. |
| 8,321,061 | B2 | 11/2012 | Anderson |
| 8,606,415 | B1 | 12/2013 | Woytowitz et al. |
| 8,876,026 | B2 | 11/2014 | Pfrenger |
| 8,919,038 | B2 | 12/2014 | Jensen |
| 8,948,979 | B2 | 2/2015 | Malsam |
| 9,555,081 | B2 | 1/2017 | Perraudin |
| 2005/0135880 | A1 | 6/2005 | Stark |
| 2006/0193695 | A1 | 8/2006 | Ranjan et al. |
| 2009/0050214 | A1* | 2/2009 | Shani ............ A01G 25/167 137/78.3 |
| 2009/0204265 | A1 | 8/2009 | Hackett |
| 2010/0010682 | A1 | 1/2010 | Cardinal et al. |
| 2010/0032493 | A1 | 2/2010 | Abts et al. |
| 2010/0305766 | A1 | 12/2010 | Runge et al. |
| 2011/0093123 | A1 | 4/2011 | Alexanian |
| 2012/0303168 | A1 | 11/2012 | Halahan et al. |
| 2015/0040473 | A1 | 2/2015 | Lankford |
| 2015/0059866 | A1* | 3/2015 | Gimenez Calbo ...... G01L 1/02 137/101.31 |
| 2015/0327450 | A1* | 11/2015 | Boudreau ............ A01G 25/16 700/284 |
| 2016/0219806 | A1* | 8/2016 | Thiessen ............ A01G 22/00 |
| 2016/0309659 | A1* | 10/2016 | Guy .................. A01G 25/16 |
| 2018/0235162 | A1 | 8/2018 | Verma |

FOREIGN PATENT DOCUMENTS

| | | |
|---|---|---|
| WO | WO2013021333 A1 | 2/2013 |
| WO | WO2013128384 A4 | 9/2013 |
| WO | WO2014073985 A1 | 5/2014 |

OTHER PUBLICATIONS

Irrometer, Soil Moisture Basics, Nov. 27, 2015, www.irrometer.com/basics.html, retrieved from internet Dec. 31, 2018, https://web.archive.org/web/20151127135024/http://www.irrometer.com/basics.html (Year: 2015).*

Shock et al, Soil Water Tension, a Powerful Measurement for Productivity and Stewardship, Feb. 2011, HortScience, vol. 46(2), 178-185 (Year: 2011).*

Mel, et al., "The NIST Definition of Cloud Computing," National Institute of Standards and Technology, Information Technology Laboratory, Special Publication 800-145, Sep. 2011, pp. 1-7.

IBM, "z/Architecture Principles of Operation," IBM® Publication No. SA22-7832-10, Eleventh Edition, Mar. 2015, (pp. 1-1732).

IBM, "Power ISA™ Version 2.07B," International Business Machines Corporation, Apr. 9, 2015, (pp. 1-1527).

Martin et al., "Methods of Determining When to Irrigate", Cooperative Extension, College of Agriculture & Life Sciences, The University of Arizona, 2001, (10 Pages).

Chahbani Technologies, "The Buried Diffuser", www.chahtech.com/en/products.html, 2014, (2 Pages).

Navarro-Hellin et al., "A Decision Support System for Managing Irrigation in Agriculture", Computers and Electronics in Agriculture, vol. 124 (2016) (pp. 121-131).

DeBaets et al., "Root Tensile Strength and Root Distribution of Typical Mediterranean Plant Species and Their Contribution to Soil Shear Strength", Plant Soil, vol. 305 (2008) pp. 207-226.

A. Brands, "Re: How is Tensile Strength of Xylem Related to Water Column Maintenance?", published May 21, 2013, MacSci Network, downloaded from: http://www.madsci.org/posts/archives/2013-03/1369201518.Bt.r.html (2 pages).

Instron, "Tensile Testing", Online Product Brochure, downloaded on Mar. 25, 2019 from: https://www.instrong.us/en-us/our-company/library/test-types/tesnsile-test (5 pages).

Agriculture Victoria, "How to Use Tensionmeters", Dept. of Environment and Primary Industries, Sep. 2000 (4 pages).

Irrometer, "Soil Moisture Basics", https://web.archive.org/web/20151127135024/http://www.irrometer.com/basics.html#use, published Nov. 27, 2015, retrieved from Internet Dec. 31, 2018 (4 pages).

Shock et al., Soil Water Tension, A Powerful Measurement for Productivity and Stewardship, HortScience, vol. 46, No. 2, Feb. 2011, pp. 178-185.

Verma, Pramod, "List of IBM Patents and/or Patent Publications Treated as Related", U.S. Appl. No. 16/695,706, filed Nov. 26, 2019, dated Nov. 26, 2019 (2 pages).

* cited by examiner

| State No. | Current State | Activities Transition Criterion | Transition Step | Next State |
|---|---|---|---|---|
| 1 | Station A Root wall Low Tensile Stress | Estimate Stress value Standard Stress Value = water content 50% | If estimated Stress value = or > Standard Stress value then water content = 50% | 6 |
|  |  | Stress Threshold = water content 40% |  |  |
|  |  | Water content = 100% |  |  |
| 2 | Station A Root wall High Tensile Stress | Estimate Stress value | If estimated Stress value = Standard Stress value, then no action | 6 |
|  |  | Standard Stress Value = water content 50% | If estimated Stress Value < Standard Stress Value and = Stress Threshold | 4 |
|  |  | Stress Threshold = water content 40% | Trigger water from Station B water source - Pull |  |
| 4 | Station B Water Source | Perform states 1 & 2 for station B | If Stress Value in state 1 has water content >= 100% then potentially Push to Station A (or draw water from Station B to Station A) |  |
|  |  |  | If Stress Value in state 1 has water content < 100% then Trigger state 5 | 5 |
| 5 | Central Station Water Source | Standard watering requirement for the Plant water | If all conditions meet and = 1 then Trigger Water to Station A till Water content = 100% |  |
|  |  | Wind, Hot, Cold, – Real time climate conditions Snow, Rain | Perform state 1 & 2 till water content = 100% while supplying water to Station A |  |
|  |  | Historical data observed in learning during different times of the day | Stop Central Station watering | 6 |
|  |  | Correlation of water activation events during a day and week patterns with the historical data |  |  |
| 6 | No action |  | Iterative Process, go back check | 1 |

PLANT-INITIATED TRIGGERING OF WATERING, INCLUDING:
- ASCERTAINING TENSILE STRESS ON A ROOT WALL OF A PLANT;
- DETERMINING WHETHER THE TENSILE STRESS ON THE ROOT WALL OF THE PLANT REACHES A SPECIFIED THRESHOLD; AND
- BASED ON DETERMINING THAT THE TENSILE STRESS ON THE ROOT WALL OF THE PLANT REACHES THE SPECIFIED THRESHOLD, FACILITATING INCREASING WATER CONTENT IN SOIL AROUND THE PLANT

405

IN WHICH ASCERTAINING TENSILE STRESS ON THE ROOT WALL OF THE PLANT INCLUDES MONITORING, VIA AT LEAST ONE SENSOR COUPLED TO A ROOT OF THE PLANT, THE TENSILE STRESS ON THE ROOT WALL OF THE PLANT

410

IN WHICH FACILITATING INCREASING THE WATER CONTENT IN THE SOIL AROUND THE PLANT COMPRISES INITIATING WATERING AROUND THE PLANT VIA AN IRRIGATION SYSTEM

415

IN WHICH THE PLANT IS A FIRST PLANT, AND THE ROOT WALL IS A FIRST ROOT WALL, AND THE METHOD FURTHER INCLUDES:

- ASCERTAINING TENSILE STRESS ON A SECOND ROOT WALL OF A SECOND PLANT ADJACENT TO THE FIRST PLANT;

- DETERMINING WHETHER THE TENSILE STRESS ON THE SECOND ROOT WALL OF THE SECOND PLANT CORRELATES TO THERE BEING EXCESS WATER CONTENT IN SOIL IN A REGION OF THE SECOND PLANT; AND

- BASED ON DETERMINING THAT THERE IS EXCESS WATER CONTENT IN THE SOIL AROUND THE SECOND PLANT, THE FACILITATING INCREASING INCLUDES FACILITATING INCREASING WATER CONTENT IN THE SOIL AROUND THE FIRST PLANT BY MOVING WATER FROM THE REGION OF THE SECOND PLANT TO THE SOIL AROUND THE FIRST PLANT

420

BASED ON THE TENSILE STRESS ON THE SECOND ROOT WALL OF THE SECOND PLANT NOT CORRELATING TO THERE BEING EXCESS WATER CONTENT IN THE SOIL AROUND THE SECOND PLANT, THE FACILITATING INCREASING INCLUDES INITIATING WATERING OF THE SOIL AROUND THE FIRST PLANT VIA AN IRRIGATION SYSTEM

FIG. 4A

425 — IN WHICH THE PLANT IS ONE PLANT OF MULTIPLE PLANTS, AND THE METHOD FURTHER INCLUDES ASCERTAINING TENSILE STRESS ON A ROOT WALL OF EACH PLANT OF THE MULTIPLE PLANTS, AND DETERMINING WHETHER TENSILE STRESS ON THE ROOT WALL OF ANY PLANT OF THE MULTIPLE PLANTS REACHES THE SPECIFIED THRESHOLD, AND BASED ON DETERMINING THAT TENSILE STRESS REACHES THE SPECIFIED THRESHOLD FOR ONE OR MORE PLANTS OF THE MULTIPLE PLANTS, FACILITATING INCREASING WATER CONTENT IN SOIL AROUND THE ONE OR MORE PLANTS WITHOUT INCREASING WATER CONTENT IN SOIL AROUND ONE OR MORE OTHER PLANTS OF THE MULTIPLE PLANTS WITH TENSILE STRESS ON THE RESPECTIVE ROOT WALLS NOT REACHING THE SPECIFIED THRESHOLD

430 — IN WHICH DATA ANALYTICS IS PERFORMED AND USED TO CONTROL THE INCREASING WATER CONTENT IN THE SOIL AROUND THE PLANT, THE DATA ANALYTICS INCLUDING REFERENCING ONE OR MORE OF A STANDARD WATERING REQUIREMENT FOR THE PLANT, REAL-TIME CLIMATE CONDITIONS IN A REGION WHERE THE PLANT IS LOCATED, HISTORICAL WATER DATA FOR THE PLANT TYPE, AND A CORRELATION OF HISTORICAL WATERING PATTERNS WITH THE HISTORICAL DATA

435 — IN WHICH FACILITATING INCREASING WATER CONTENT INCLUDES CONTROLLING THE INCREASING OF THE WATER CONTENT IN THE SOIL AROUND THE PLANT WITH REFERENCE TO, AT LEAST IN PART, REAL-TIME AND FORECASTED CLIMATE CONDITIONS FOR A REGION WHERE THE PLANT IS LOCATED

440 — IN WHICH THE FACILITATING INCREASING IS VIA A COGNITIVE WATERING SYSTEM, THE COGNITIVE WATERING SYSTEM CONTROLLING THE INCREASING OF THE WATER CONTENT IN THE SOIL AROUND THE PLANT IN ORDER TO OPTIMIZE AN ASSOCIATION BETWEEN THE WATER CONTENT IN THE SOIL AROUND THE PLANT AND THE TENSILE STRESS ON THE ROOT WALL OF THE PLANT FOR ONE OR MORE ENVIRONMENTAL CONDITIONS TO WHICH THE PLANT IS CURRENTLY, OR FORECASTED TO BE, EXPOSED

445 — IN WHICH THE COGNITIVE WATERING SYSTEM AUTOMATICALLY STOPS THE INCREASING OF WATER CONTENT IN SOIL AROUND THE PLANT WHEN TENSILE STRESS ON THE ROOT WALL REACHES A DESIRED STATE BASED, AT LEAST IN PART, ON HISTORICAL ABSORPTION CAPACITY OF THE PLANT

FIG. 4B

COGNITIVE SYSTEM USING PLANT-BASED DATA TO TRIGGER WATERING

BACKGROUND

As is known, irrigation may be used to assist in the growth of agricultural crops, maintenance of landscapes, revegetation of disturbed soils in dry areas and during periods of inadequate rainfall, etc. Traditional irrigation approaches may supply a controlled amount of water to plants (including, for instance, trees) at regular intervals. Irrigation and other plant watering systems are typically push-based systems, which based on one or more factors push water towards the plants to be irrigated. These systems are not always effective, or efficient, and can lead to insufficient water, or surplus water, in the soil around the plants, which may lead to plant damage and/or water wastage. Wasting of water, whether by a manual or automatic watering approach, can lead to flooding of a region of soil, and damage to the soil as well as to the plant(s).

SUMMARY

Shortcomings of the prior art are overcome and additional advantages are provided through the provision herein of a method which includes providing at least one first sensor to ascertain water content within a xylem of a root of a first plant to determine tensile stress of a first root wall of the first plant, and providing at least one second sensor to ascertain water content within a xylem of a root of a second plant to determine tensile stress of a second root wall of the second plant. Further, the method includes operatively coupling the at least one first sensor and the at least one second sensor to a control to determine whether the tensile stress on the first root wall of the first plant reaches a specified threshold, and to determine whether the tensile stress on the second root wall of the second plant correlates to there being excess water content in soil in a region of the second plant. Based on determining that the sensed tensile stress on the first root wall of the first plant reaches the specified threshold, and based on the control determining that there is excess water content in the soil around the second plant, initiating, via the control, increasing water content in soil around the first plant by moving water from the region of the second plant to the soil around the first plant.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3B depicts one embodiment of a state table for a cognitive watering system process, in accordance with one or more aspects of the present invention;

FIGS. 4A-4B illustrate further details of one embodiment of a cognitive water system process with plant-initiated triggering of watering, in accordance with one or more aspects of the present invention;

DETAILED DESCRIPTION

The description that follows includes exemplary devices, systems, methods, techniques and instruction sequences that embody techniques of the present invention. However, it should be understood that the described invention may be practiced, in one or more aspects, without the specified details. In other instances, note that known protocols, structures and techniques have not been shown in detail in order not to obscure the invention. Those of ordinary skill in the art will appreciate that the described techniques and mechanisms may be applied to various systems to facilitate implementing a cognitive watering approach, in accordance with one or more aspects of the present invention.

Oftentimes, it may be difficult or problematic to ensure the health of a green environment, and more particularly, the health of the plants around us, since water is a base necessity in keeping the green environment healthy. Insufficient, or even surplus, water can lead to unhealthy plants, as well as water wastage in the case of overwatering. Current water systems, such as used in irrigation or other plant watering, are typically push-based systems which are not 100% effective or efficient. For instance, as with manual watering, an irrigation system, such as a programmable irrigation system, may push too much water, or insufficient water to the plants, which may be wasteful, or if insufficient may result in insufficient water intake by the plants. Unpredictable water conditions may lead to unhealthy plants with little or no surplus water. Also, water wastage, whether via a manual or automatic watering approach, can lead to flooding of an area, resulting in soil damage. Addressing these issues, provided herein, in one or more aspects, is a cognitive watering system and process with plant-initiated triggering of watering. The cognitive watering system, described further below with reference to FIGS. 1-7, is, in part, an automatic pull-type watering approach where the plants provide information to initiate watering, as well as feedback to ensure pulling of an appropriate amount of water. (Note that, as used herein, "plant" may refer to any type of plant, including any type of tree.)

More particularly, a plant-initiated cognitive mechanism is provided for watering of the plant. The mechanism includes ascertaining an optimum tensile stress on a root wall xylem of the plant to facilitate dynamic water needs of the plant at a given time, and correlating the same with multiple data inputs and historical patterns, as well as performing the watering, in one or more embodiments, using (for instance) a water pull mechanism. By way of example, cognitive water irrigating may be implemented that predicts and supplies water to a plant only when desired by the plant, and stops the watering when the tensile stress of the root wall reaches a desired state based, at least in part, on historical absorption capacity of the plant.

Figure 1:
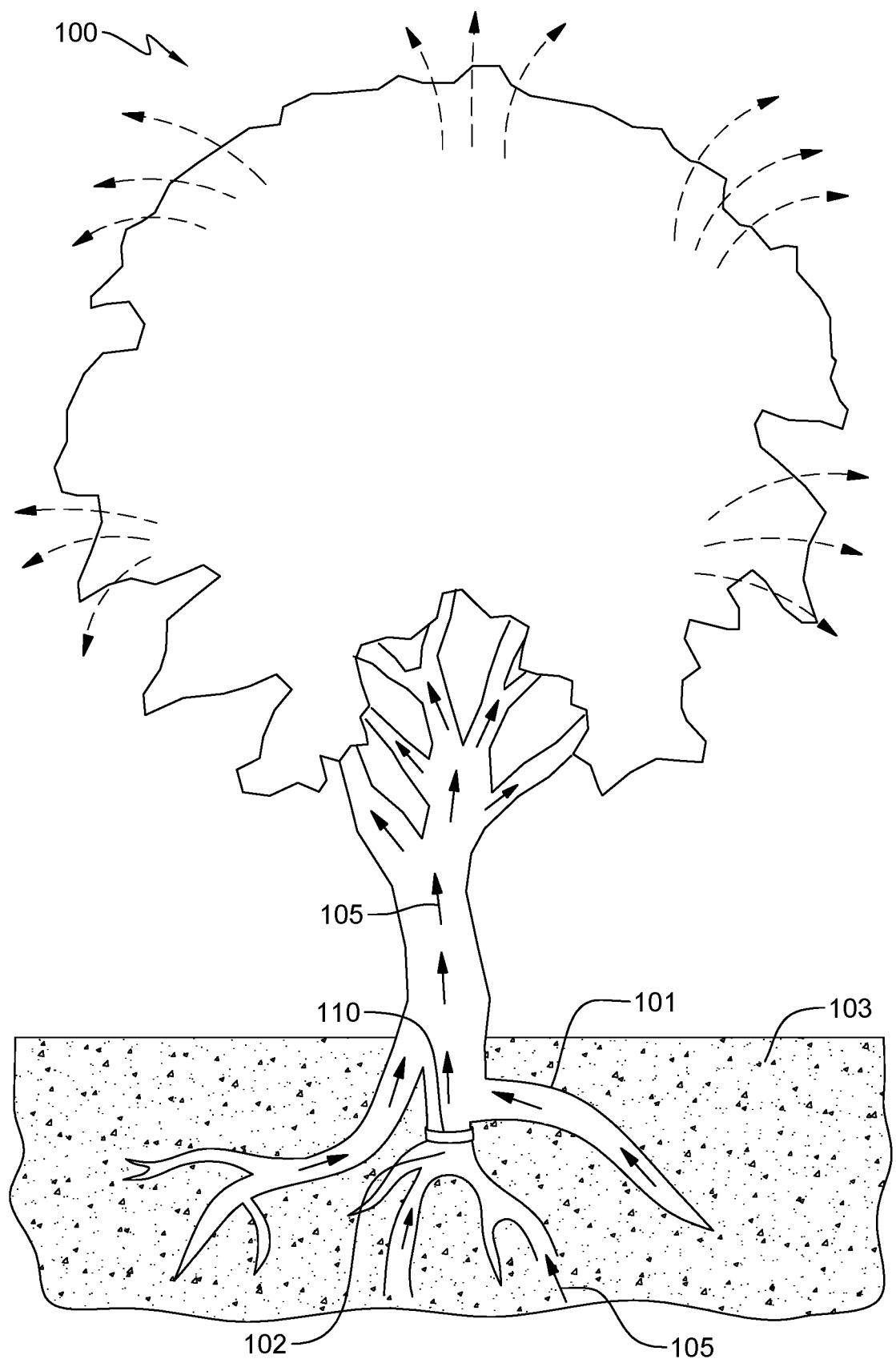
FIG. 1 illustrates use of water by a plant, as well as use of a tensile stress sensor on a root wall of the plant, in accordance with one or more aspects of the present invention.

FIG. 1 depicts one embodiment of a plant, generally denoted 100, which in part illustrates the phenomenon of water absorption. As illustrated, plant 100, which may be any type of plant, including a tree, has roots 101, including a main root 102, extending in soil 103 in the region around plant 100. As illustrated, water 105 is absorbed by roots 101 from soil 103, and moves upward due to pressure exerted by the root cells. The upper movement of water into the plant ultimately is evaporated into the atmosphere from leaf surfaces. The process is known as transpiration, wherein moisture is carried through the plant from the roots to the small pores on the underside of leaves, where it changes to vapor and is released to the atmosphere. Water absorbed by the roots may pass to the leaves through the xylem of the stem, which is the vascular tissue in plants that conducts water and dissolved nutrients upward from the root. As a result of transpiration, tensile stress on root walls of the plant changes. When tensile stress on a root wall, such as a root wall of main root 102, is high, such as at or above a specified stress threshold, additional water is required by the plant. Conversely, if tensile stress on the root wall (e.g., the xylem) is low, for instance below the specified (stress) threshold, then additional water is not required in the soil around the plant. Note in this regard that the tensile stress on the root walls may vary depending on, for instance, time of day, and weather conditions, as well as the type of plant in need of water. Certain plants require daily watering, for instance, at certain intervals, while other plants do not need water for a number of days depending on the type of plant, as well as type of surrounding soil within which the plant is rooted. Water content (or moisture content) refers to the quantity of water contained in a material, such as soil. Water content may be expressed as a ratio, which can range from 0 (completely dry) to the value of the material's porosity at saturation. Water content can be directly measured using a known volume of the material. Volumetric water content may be calculated via the volume of water and the mass of water. There is a direct relationship between the tensile stress on the root wall of the plant, and the water content within the respective root, and thus, in the soil surrounding the root. By way of example, a water content threshold or cut off for a plant may be approximately 40%. From this number, a specified threshold for the tensile stress may be established by one skilled in the art. Note that if desired, one or more soil moisture sensors may also be used in association with the tensile stress sensor(s) discussed herein.

By way of further explanation, the stress applied to a material is the force per unit area applied to the material. The maximum stress a material can withstand before breaking is called the breaking stress or ultimate tensile stress. Tensile means the material is under tension. Forces acting on it are trying to stretch the material. The pressure in root walls develops when the rate of transpiration is low. In such a case, water is forced from the high pressure in roots to the low pressure in the leaves. This forcing can create a high tensile stress.

In accordance with one or more aspects of the present invention, one or more tensile stress sensors 110 are placed on one or more roots 101, such as main root 102 of plant 100 to, for instance, sense or monitor tensile stress on the root wall(s) of the plant as an indication of the amount of water within the root. This information may then be used to allow the plant itself to effectively initiate watering when additional water is required. A variety of tensile stress sensing techniques may be employed in tensile stress sensor 110. In one or more embodiments, tensile stress sensor 110 may be affixed (e.g., pivotally affixed) to a root 101 of plant 100 via an elastic band, allowing the root to move and expand as the plant grows. More particularly, in one or more embodiments, the tensile stress sensor may be used to determine tensile stress in the xylem of the root wall, and may be placed next to the xylem in, for instance, the main root of the plant, via a connection using fine insertions of one or more probes into the root, without damaging the entire root vessel. A grid of such probes can form a plant root probe. The tensile stress on the root wall of the plant may be determined using a sensor attached to the root or connected via a needle in the root of the tree. This configuration has the capability of determining tensile stress at intervals on the inner root walls.

Figure 2:
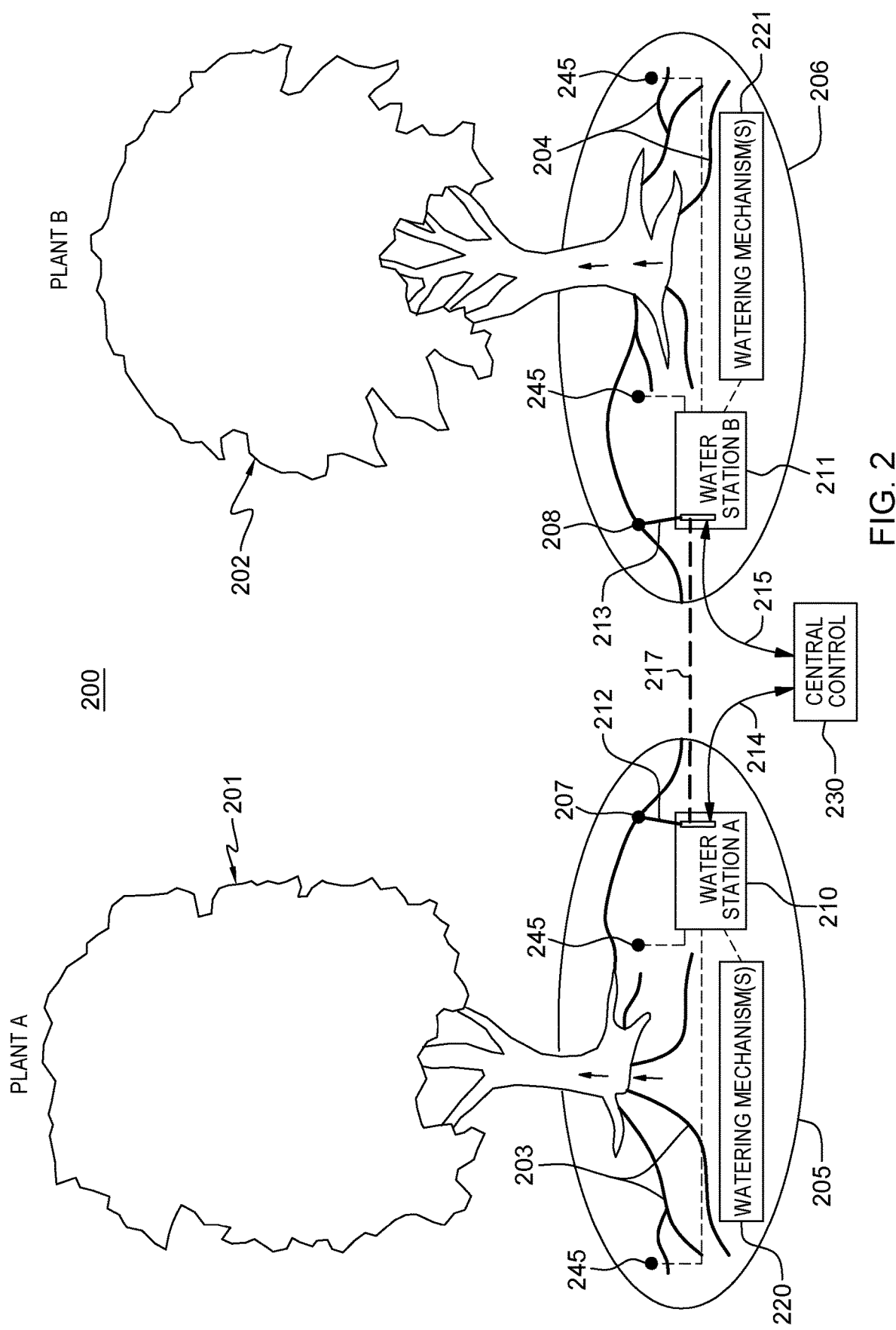
FIG. 2 depicts one embodiment of a cognitive watering system with plant-initiated triggering of watering, in accordance with one or more aspects of the present invention.

FIG. 2 depicts one embodiment of a cognitive watering system, generally denoted 200, with plant-initiated triggering of watering, in accordance with one or more aspects of the present invention. In FIG. 2, cognitive watering system 200 facilitates providing a desired watering to a first plant, plant A 201, and a second plant, plant B 202. As noted above, the plants may be any type of plant, including any type of tree. Plant A 201 includes roots 203 which extend around plant A 201 in a region 205 of soil, and plant B 202 includes roots 204 which extend around plant B 202 in a region 206 of soil around the plant. One or more tensile stress sensors 207 are disposed on one or more roots 203 of plant A 201, and one or more tensile stress sensors 208 are disposed on one or more roots 204 of plant B 202. Tensile stress sensors 207, 208 are similar to tensile stress sensors 110, described above in connection with FIG. 1. These sensors provide information on the tensile stress on the root wall(s) of the respective plant, and this information is used to initiate watering when the plant is stressed and additional water is required in the soil around the plant. In one or more implementations, tensile stress sensors 207, 208 monitor the tensile stress at, for instance, the main roots of plants A, B, respectively. If the sensed tensile stress is low, additional water is not required at this time, while if tensile stress on the root wall is high, such as beyond a certain specified (stress) threshold, then a signal can be sent indicative of the need for additional water in the region 205 and/or 206 around plant A 201 or plant B 202. Note that, in this manner, watering of the plants may be individualized to the plant itself using cognitive watering system 200, that is, water may be provided to only those plants with a root wall tensile stress that has reached the specified threshold.

In the example depicted, cognitive watering system 200 also includes a water station A 210 associated with plant A 201, and a water station B 221 associated with plant B 202. Water station A 210 includes, by way of example, irrigation tubing and irrigation heads 245, along with one or more watering mechanisms 220, and water station B 211 includes, or has associated therewith, irrigation tubing and irrigation heads 245, along with one or more watering mechanisms 221. Watering mechanisms 220, 221 may each be, in one or more embodiments, an at least partially in ground mechanism which may facilitate pulling or pushing of water content between adjacent regions, for instance, between soil region 205 and adjacent soil region 206 in a case where, for instance, plant A 201 is stressed and requires additional water, while plant B has excess water to share. Various technologies may be employed in implementing watering mechanisms 220, 221 such as described herein. For instance, the apparatuses may implement irrigation and drainage based on hydrodynamic unsaturated fluid flow where, for instance, there is a saturated zone and at least one pipe in communication with the saturated zone, and the pipe may be configured to include a tubarc porous microstructure for conducting water from the saturated zone to an unsaturated zone. In another example, fluid conduction may occur utilizing a reverse unsaturated siphon with tubarc porosity action. Still further, a hydrophilic delivery device may be employed between the different regions, or more particularly between the different plants. Further, the mechanisms may employ water management units for extracting water from moist soil to be transported by siphoning from one region to another region.

As shown, a central control system 230 may communicate, in one or more embodiments, and control water station A 210 and water station B 211, as described herein. In particular, central control 230 may be in wireless or wired communication 214, 215 with water station A 210 and water station B 211, respectively. Similarly, water station A 210 and water station B 211 may be coupled 217 for wireless or wired communication, depending on the implementation.

In the embodiment illustrated, water station A receives signals 212 from one or more tensile stress sensors 207 disposed on or around roots 203 of plant A 201, and water station B 211 receives signals 213 from one or more tensile stress sensors 208 disposed on roots 204 of plant B 202. As noted, irrigation tubing and irrigation heads 245 may be provided in association with water station A, as well as water station B, to receive water from, for instance, a central irrigation system associated with a central control 230. Further, as noted, water station A and water station B may communicate 217 directly, or may communication through central station 230, depending on the implementation.

In implementation, if water content in the root of plant A 201 is low, for instance, below a predefined stress threshold, such as 40% (indicative of a high tensile stress on the plant root wall), then water station A 210 may send signals to, for instance, any nearby water station, such as water station B 211, as well as to central control 230, for instance, in an iterative interval fashion. The decision whether and how to water plant A 201 may be made by the cognitive watering system based on multiple inputs each time a plant sends data indicative of a request for water (such as by, for instance, the one or more tensile stress sensors sensing tensile stress of a root wall at the specified threshold). Central control 230 may automatically consider the multiple inputs and perform data analytics on data received from, for instance, water station A 210, water station B 211, as well as other sources in deciding whether to dispatch, and if so, how best to dispatch, water to plant A 201, in this example. For instance, central station 230 may include artificial intelligence which may reference one or more of standard watering requirements for the plant type at issue, real-time (as well as predicted) climate conditions, such as wind, hot/cold temperatures, snow, rain, etc., historical data observed during different times of day, as well as a correlation of water activation events during (for example) a time of day, or day of year, with historical data. Additionally, the central control may implement self-learning based on the input data, and absorption capacity and/or water flow of the plant type at issue. Using this information, central station may initiate watering as described herein, which may subsequently automatically be stopped when the one or more tensile stress sensors 207 sense that water level in the roots of plant A are at a desired state. In this manner, sufficient watering of the plant is ensured, as well as preventing excess watering, and water wastage.

Figure 3A:
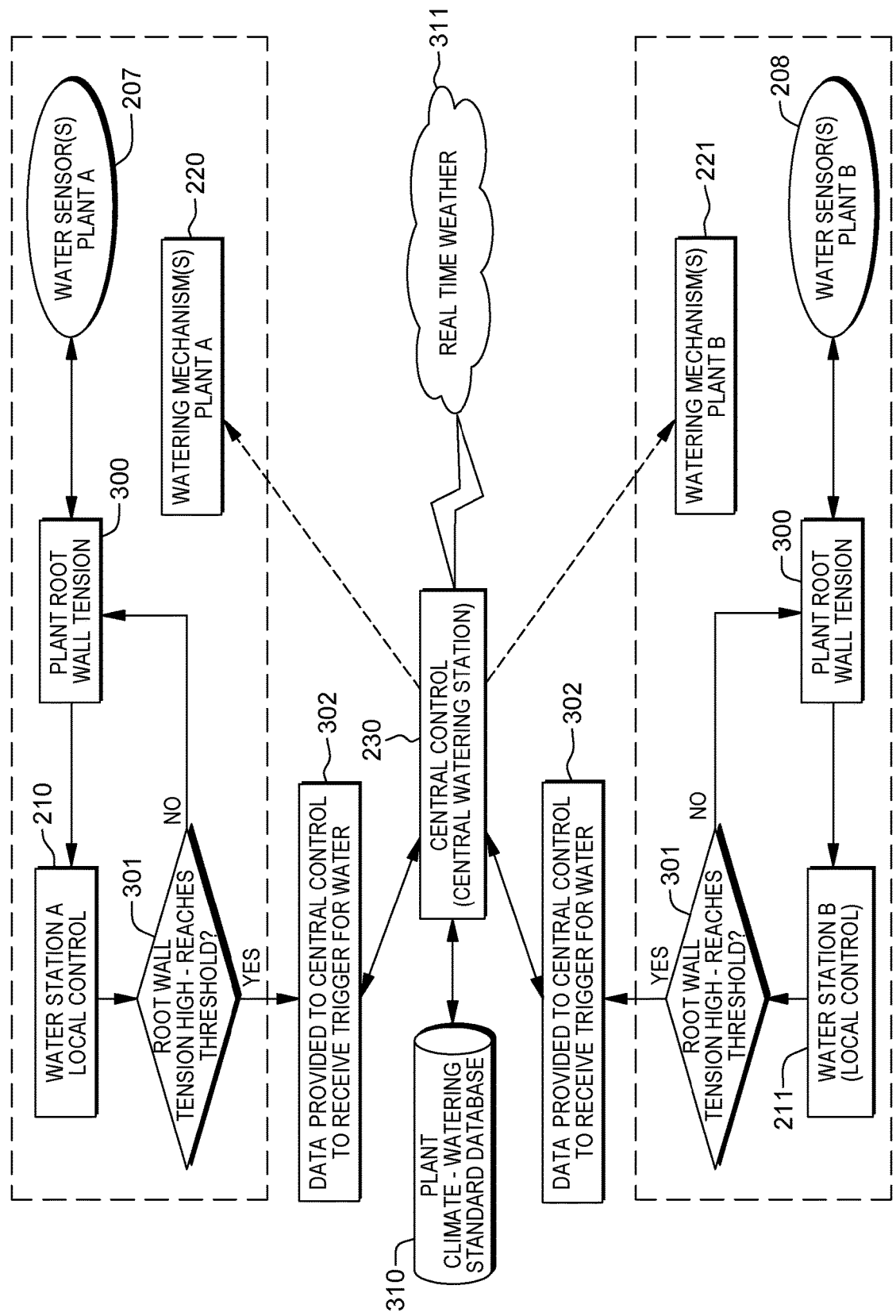
FIG. 3A depicts further details of one embodiment of a cognitive watering system and process, in accordance with one or more aspects of the present invention.

FIG. 3A depicts further details of one embodiment of a cognitive watering system and process, in accordance with one or more aspects of the present invention. This cognitive watering system and process illustrates (by way of example only) one operational embodiment for watering one or more of plant A and plant B of the system example of FIG. 2. As illustrated, water station A 210 receives (e.g., periodically) a plant root wall tension reading 300 from one or more tensile stress sensors 207 disposed on one or more roots of plant A, and determines whether the root wall tension is low, that is, has reached a specified (stress) threshold 301. Assuming that the root wall tension is high, indicative of plant A having sufficient water, no action is taken. However, where the sensed tensile stress on the root wall of plant A reaches the specified threshold, then data is provided to, for instance, central control 230 to determine whether to trigger for water 302.

Similarly, water station B 211 receives (e.g., periodically) a plant root wall tension reading 300 from one or more tensile stress sensors 208 disposed on one or more roots of plant B, and determines whether the root wall tension is high, that is, has reached the specified (stress) threshold 301. Assuming that the root wall tension is low, indicative of plant B having sufficient water, no action is taken. Should the sensed tensile stress on the root wall of plant B reach the specified threshold, then data is provided to, for instance, central control 230 to determine whether to trigger for water 302 for plant B.

Various control implementations are possible. For instance, central control 230 (e.g., a central watering station) may be or include, in one or more embodiments, an artificial intelligence based control mechanism which may use, in part, one or more cloud-based services. As noted, the decision whether to trigger for watering either plant A or plant B (in this example) may be based on multiple inputs each time data is provided to central control indicative of root wall tension being at a specified threshold. This coordination of communication and analytics may occur automatically, with central control 230 performing data analytics on the data received from the station with, for instance, one or more of the following information before dispatching a supply of water to the requesting water station. For instance, one or more plant climate-watering standard databases 310 may be accessed or referenced, along with, for instance, cloud-based real-time and predicted climate information 311. In particular, the central control may consider standard water requirements for the particular plant type at issue, real-time climate conditions as well as predicted climate conditions, such as wind, heat, cold, precipitation, etc., as well as historical data observed in learning watering requirements during different times of day, days of the year, etc., as well as a correlation of water activation events during a day, or other time-interval pattern with historical data. Further, the central control may implement a self-learning based on the input data and the absorption capacity or water flow through the particular plant or plant type. Based on this information, the central control may automatically stop watering of the soil in the region of the plant at issue to bring the water level, for instance, in the main root of the plant to a desired state. In this manner, the feedback from the plant itself may result in a pulling of the needed amount of water to the plant, ensuring an efficient watering approach without under watering or over watering the plant.

Those skilled in the art should note that various watering approaches may be employed in combination with a cognitive watering system with plant-initiated triggering of watering as described herein. For instance, if available water content in the root of a plant is below a specified threshold, for instance, below 40%, indicative of a high tensile stress on the root wall, then the associated water station may, in one or more embodiments, send signals to a nearby water station, associated with another plant, as well as to the central control, in an iterative fashion. The central control may communicate with the adjacent water station and determine whether water may be pulled or pushed using, for instance, watering mechanism(s) of plant A 220 and/or watering mechanism(s) of plant B 221 to move water from a region of the soil around plant B to a region of soil around plant A (as described above in connection with FIG. 2), or whether to employ the irrigation tubing and irrigation heads to water from the central station the soil region around plant A, for instance, in the case where plant B does not have excess water in the soil around the plant. Alternatively, the cognitive watering system and plant initiated triggering of watering disclosed herein, could be used solely with a central watering station, without use of in ground watering mechanism(s) 220, 221 to move water between adjacent regions when possible.

By way of further example, FIG. 3B depicts one embodiment of a process state table which may be implemented, for instance, by a cognitive watering system and process such as described above in connection with FIGS. 2 & 3A. As illustrated in FIG. 3B, in state 1 station A a low tensile stress is sensed at the root wall. The activities transition criterion may estimate the plant stress value from the tensile stress on the root wall. With the standard stress value being a water content of 50%, a plant stress threshold where water content is 40% or less, and a full water content of 100%. If the estimated plant stress value is less than or equal to the standard stress value, then the water content is approximately 50%. The next state is state 6, where no action is required. From state 6, the cognitive system repeats the process returning to state 1. In state 2, station A monitors a high root wall tensile stress. The transition criterion includes estimating the plant stress value. If the estimated plant stress value is a standard stress value, then no action is taken and state 6 is entered. Otherwise, processing determines whether the standard stress value equals water content of 50% or if the estimated stress value is less than the standard stress value, e.g., a stress threshold has been reached where state 4 is entered. If the plant stress threshold equals water content 40%, meaning that the threshold had been reached or exceeded, then in one or more embodiments, a trigger may be sent to pull water from a nearby station, such as station B where station B has excess water capacity.

In state 4, water station B acts as a water source for water station A, with water station B performing states 1 and 2. If the stress value in state 1 for water station B has water content greater than or equal to 100%, then a potential push of water to station A is identified, or alternatively water station A may proceed with drawing or pulling water from water station B. Note that the drawing or pushing of water may be, for instance, transfer of water in tubing between the different regions associated with plant B and plant A, or, alternatively, by moving or drawing water through the soil from the region around plant B to the region around plant A, as described herein. If the stress value in state 1 for station B has a water content less than 100%, then state 5 may be triggered.

In state 5, the central water station is the source of water for, for instance, station A to water the soil around plant A. The activities transition criterion includes standard watering requirements for the plant to receive water, if all conditions are met, and equal 1, then water is sent to station A until (for example) water content equals 100% at the root wall of plant A. As noted, the central watering station may reference real-time climate conditions, such as wind, hot, cold, snow, rain, and perform states 1 and 2 on, for instance, plant A, until the water content equals 100% while water is being supplied to station A. Historical data observed in learning about the plant during different times of day may be used to facilitate a stop watering criterion to transition to state 6, as well as a correlation of water activation events during a day or week patterns with the historical data.

By way of further example, FIGS. 4A & 4B depict a general plant initiated triggering of watering process, in accordance with one or more aspects of the present invention. The plant initiating triggering of watering 400, may include ascertaining tensile stress on the root wall of a plant, and determining whether tensile stress on the root wall of the plant reaches a specified threshold. Based on determining that the tensile stress on the root wall reaches the specified threshold, then water content in the soil around the plant is increased. In one or more implementations, ascertaining tensile stress on the root wall of the plant may include monitoring, via at least one sensor coupled to a root of the plant, the tensile stress on the root wall of the plant 405. Further, facilitating increasing the water content of the soil around the plant may include initiating watering around the plant via an irrigation system 410.

In one or more embodiments, the plant may be a first plant, and the root wall may be a first root wall, and the method may further include: ascertaining tensile stress on a second root wall of a second plant adjacent to the first plant; determining whether the tensile stress on the second root wall of the second plant correlates to there being excess water content in soil in a region of the second plant; and based on determining that there is excess water content in the soil around the second plant, the facilitating increasing may include facilitating increasing water content in the soil around the first plant by moving water from the region of the second plant to the soil around the first plant 415. Further, based on the tensile stress of the second root wall of the second plant not correlating to there being excess water content in the soil around the second plant, the facilitating increasing may include initiating watering of the soil around the first plant via an irrigation system 420.

In one or more embodiments, the plant may be one plant of multiple plants, and the method may further include ascertaining tensile stress on a root wall of each plant of the multiple plants, and determining whether tensile stress on the root wall of any plant of the multiple plants reaches the specified threshold 425. Based on determining that the tensile stress reaches a specified threshold for one or more plants of the multiple plants, increasing water content in the soil around the one or more plants may be facilitated without increasing water content in the soil around one or more other plants of the multiple plants with tensile stress on their respective root walls not reaching the specified threshold.

In one or more embodiments, data analytics may be performed, and used to control, at least in part, the increasing of water content in the soil around the plant 430. The data analytics may include referencing one or more of a standard watering requirement for the plant, real-time climate conditions in the region the plant is located, historical watering data for the plant or plant type, and a correlation of historical watering patterns with historical data. In one or more embodiments, facilitating increasing water content may include controlling the increasing of water content in the soil around the plant with reference to, at least in part, real-time and forecasted climate conditions for a region where the plant is located 435.

In one or more implementations, the facilitating increasing may be via a cognitive water system, and the cognitive water system may control the increasing of the water content in the soil around the plant in order to optimize an association between the water content in the soil around the plant and the tensile stress on the root wall of the plant for one or more environmental conditions to which the plant is currently, or forecasted to be, exposed 440. In one or more embodiments, the processing may include automatically stopping, by the cognitive water system, the increasing of water content in the soil around the plant when tensile stress of the root wall reaches a desired state based, at least in part, on historical absorption capacity of the plant 445.

Further exemplary embodiments of a computing environment to implement one or more aspects of the present invention are described below with reference to FIGS. 5-7.

Figure 5:
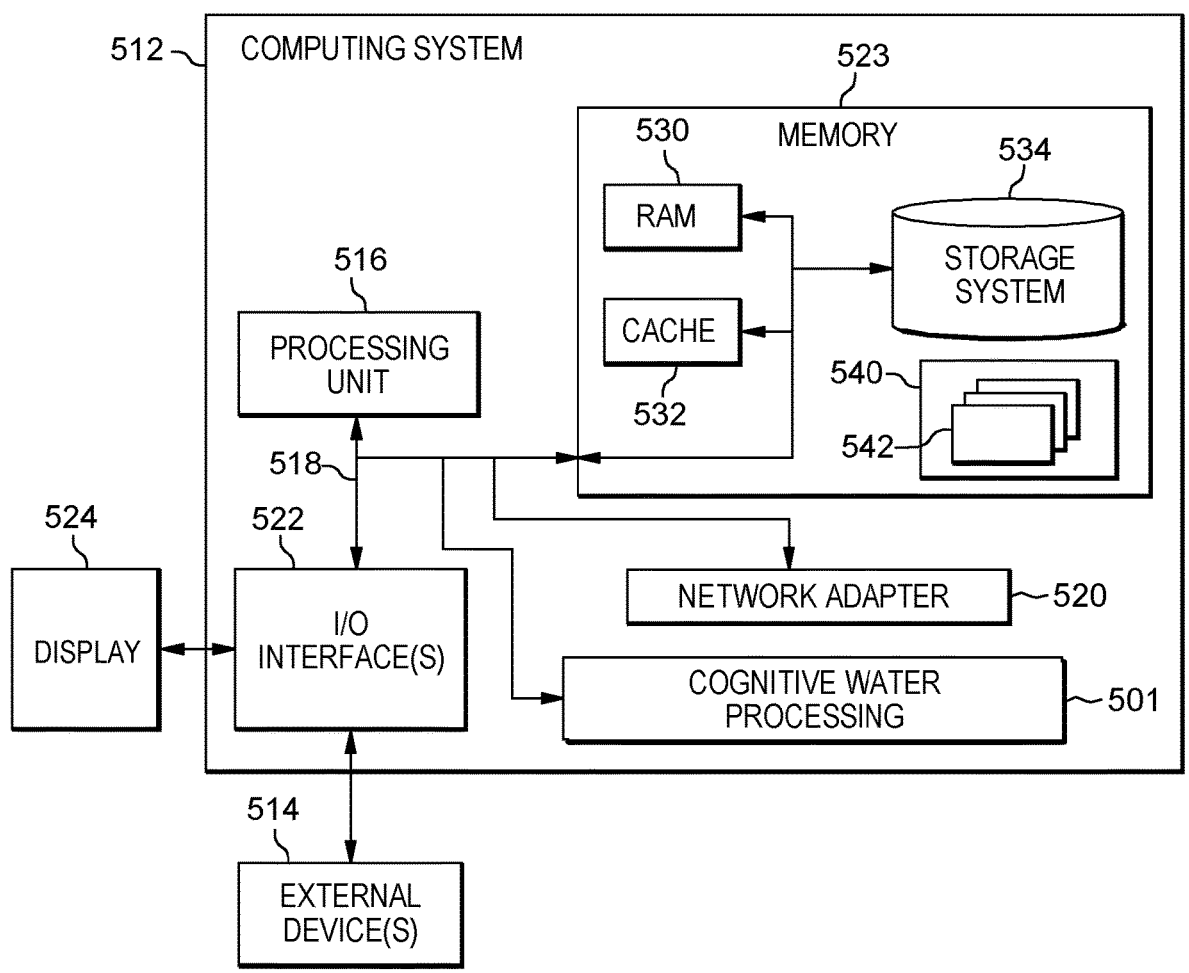
FIG. 5 depicts one embodiment of a computing system which may implement or facilitate implementing cognitive watering of plants, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a server, a desktop computer, a workstation, a wireless computer, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a water-related processing system, module, logic, etc., 501 may be provided within computing environment 512 for controlling plant watering, as described herein.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
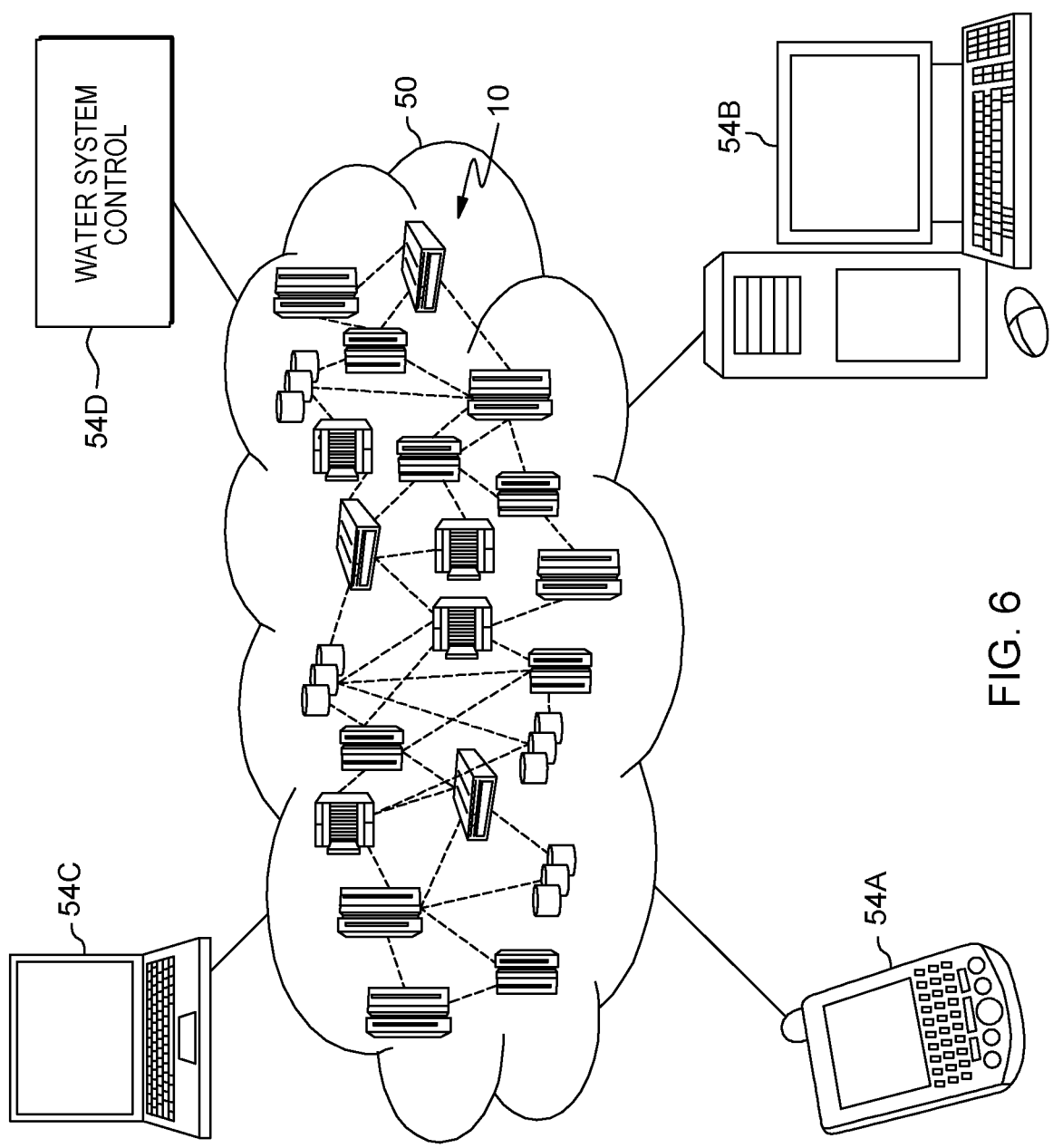
FIG. 6 depicts one embodiment of a cloud-computing environment which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or in, for instance, a water system control may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 6 are intended to be illustrative only and that computing nodes 10 and cloud computing environment 50 can communicate with any type of computerized device over any type of network and/or network addressable connection (e.g., using a web browser).

Figure 7:
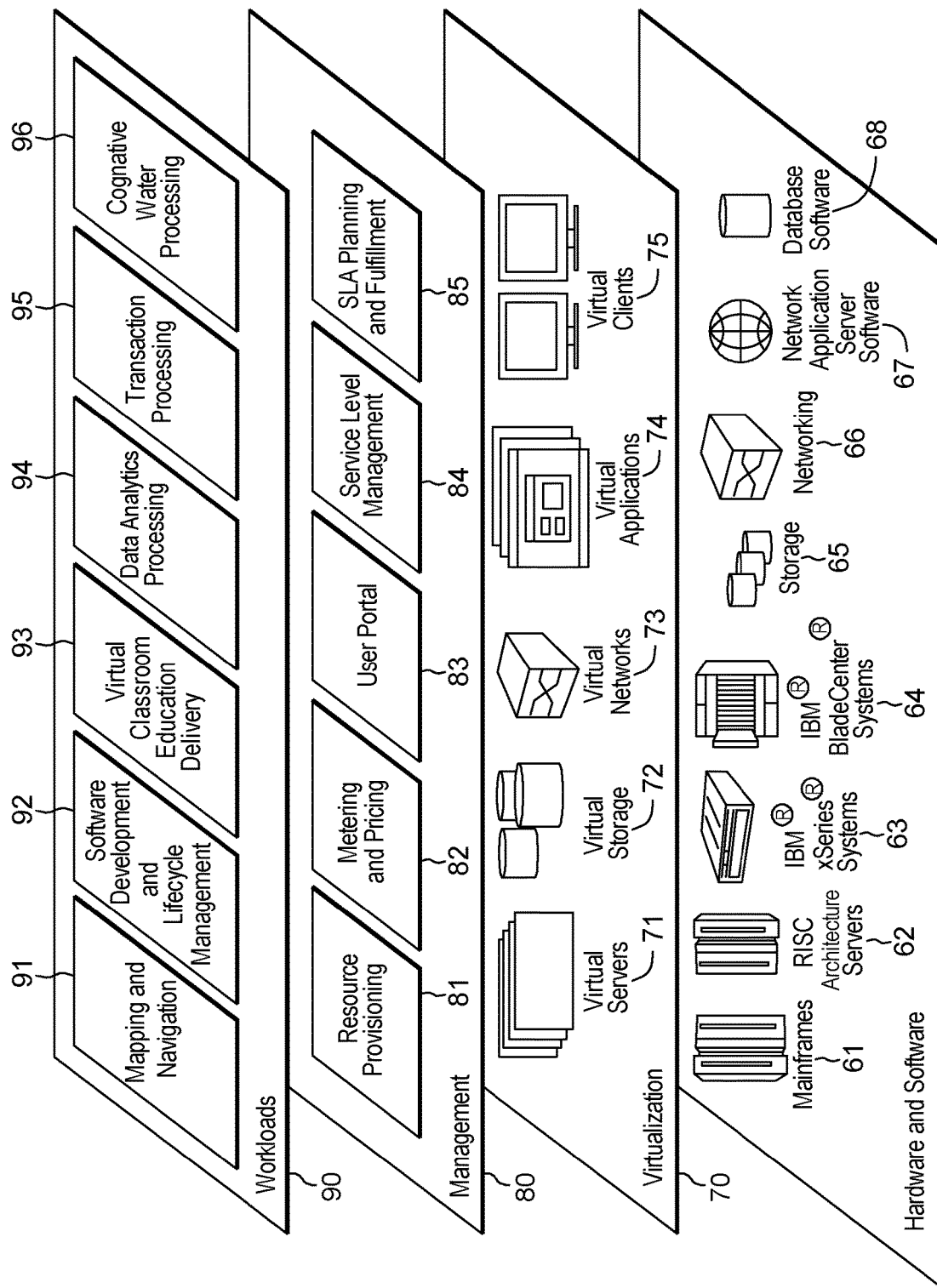
FIG. 7 depicts an example of extraction model layers, which may facilitate implementing cognitive watering of plants, in accordance with one or more aspects of the present invention.

Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, water management processing 96 for various workloads and functions for managing plant watering. One of ordinary skill in the art will appreciate that the water management processing 96 may also work in conjunction with other portions of the various subtraction layers, such as those in hardware and software 60, virtualization 70, management 80, and other workloads 90 (such as data analytics processing 94, for example) to accomplish the various purposes of the illustrated embodiments of the present invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of plant-initiated triggering of watering, the method comprising:
   providing at least one first sensor to ascertain water content within a xylem of a root of a first plant to determine tensile stress on a first root wall of the first plant;
   providing at least one second sensor to ascertain water content within a xylem of a root of a second plant to determine tensile stress on a second root wall of the second plant;
   operatively coupling the at least one first sensor and the at least one second sensor to a control to determine whether the tensile stress on the first root wall of the first plant reaches a specified threshold, and to determine whether the tensile stress on the second root wall of the second plant correlates to there being excess water content in soil in a region of the second plant; and
   based on determining that the sensed tensile stress on the first root wall of the first plant reaches the specified threshold, and based on the control determining that there is excess water content in the soil around the second plant, initiating, via the control, increasing water content in soil around the first plant by moving water from the region of the second plant to the soil around the first plant.

2. The method of claim 1, wherein the control is configured to automatically increase the water content in the soil around the first plant by transferring water from the region of the second plant to the soil around the first plant.

3. The method of claim 1, wherein the control is configured to increase water content in the soil around the first plant via an irrigation system based on the tensile stress on the second root wall of the second plant not correlating to there being excess water content in the soil around the second plant.

4. The method of claim 1, wherein the control is configured to perform data analytics, and based at least in part thereon, control the increasing water content in the soil around the plant, the data analytics including referencing one or more of a standard watering requirement for the first plant, real-time climate conditions in a region where the first plant is located, historical water data for the first plant type, and a correlation of historical watering patterns with the historical data.

5. The method of claim 1, wherein the control is configured to initiate increasing the water content in the soil around the first plant with reference to, at least in part, real-time and forecasted climate conditions for a region where the first plant is located.

6. The method of claim 1, wherein the control is configured to initiate increasing the water content in the soil around the first plant to optimize an association between the water content in the soil around the first plant and the tensile stress on the first root wall of the first plant for one or more environmental conditions to which the first plant is currently, or forecasted to be, exposed.

7. The method of claim 6, wherein the control is configured to automatically stop the increasing water content in the soil around the first plant when tensile stress on the root wall of the plant reaches a desired state based, at least in part, on historical absorption capacity of the first plant.

8. A computer program product for facilitating plant-initiated triggering of watering, the computer program product comprising:
   at least one non-transitory computer-readable storage medium having computer-readable code embodied therewith, the computer-readable code being executable by a processor to perform a method comprising:
      receiving sensor data from at least one first sensor indicative of water content within a xylem of a root of a first plant for use in determining tensile stress on a first root wall of the first plant;
      receiving sensor data from at least one second sensor indicative of water content within a xylem of a rood of a second plant for use in determining tensile stress on a second root wall of the second plant;
      based on the sensor data received from the at least one first sensor and the sensor data received from the at least one second sensor, determining whether the tensile stress on the first root wall of the first plant reaches a specified threshold, and determining whether the tensile stress on the second root wall of the second plant correlates to there being excess water content in the soil in a region of the second plant; and
      based on determining that the sensed tensile stress on the first root wall of the first plant reaches a specified threshold, and based on determining that there is excess water content in the soil around the second plant, initiating moving water from the region of the second plant to soil around the first plant to increase water content in the soil around the first plant.

9. The computer program product of claim 8, wherein the control is configured to automatically increase the water content in the soil around the first plant by transferring water from the region of the second plant to the soil around the first plant.

10. The computer program product of claim 8, wherein the control is configured to increase water content in the soil around the first plant via an irrigation system based on the tensile stress on the second root wall of the second plant not correlating to there being excess water content in the soil around the second plant.

11. The computer program product of claim 8, wherein the control is configured to perform data analytics, and based at least in part thereon, control the increasing water content in the soil around the plant, the data analytics including referencing one or more of a standard watering requirement for the first plant, real-time climate conditions in a region where the first plant is located, historical water data for the first plant type, and a correlation of historical watering patterns with the historical data.

12. The computer program product of claim 8, wherein the control is configured to initiate increasing the water content in the soil around the first plant with reference to, at least in part, real-time and forecasted climate conditions for a region where the first plant is located.

13. The computer program product of claim 8, wherein the control is configured to initiate increasing the water content in the soil around the first plant to optimize an association between the water content in the soil around the first plant and the tensile stress on the first root wall of the first plant for one or more environmental conditions to which the first plant is currently, or forecasted to be, exposed.

14. The computer program product of claim 13, wherein the control is configured to automatically stop the increasing water content in the soil around the first plant when tensile stress on the root wall of the plant reaches a desired state based, at least in part, on historical absorption capacity of the first plant.

* * * * *